US012584726B2

(12) United States Patent
Deck

(10) Patent No.: US 12,584,726 B2
(45) Date of Patent: Mar. 24, 2026

(54) INTERFEROMETRIC METHOD FOR MEASURING OPTICAL DISTANCE

(71) Applicant: Zygo Corporation, Middlefield, CT (US)

(72) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 96 days.

(21) Appl. No.: 18/820,386

(22) Filed: Aug. 30, 2024

(65) Prior Publication Data

US 2025/0123093 A1 Apr. 17, 2025

Related U.S. Application Data

(60) Provisional application No. 63/544,019, filed on Oct. 13, 2023.

(51) Int. Cl.
*G01B 9/02015* (2022.01)
*G01B 9/02* (2022.01)

(52) U.S. Cl.
CPC ..... *G01B 9/02015* (2013.01); *G01B 9/02049* (2013.01); *G01B 9/02083* (2013.01)

(58) Field of Classification Search
CPC ............ G01B 9/02015; G01B 9/02049; G01B 9/02083; G01B 9/02072; G01B 11/14; G01J 3/45; G01J 2009/0223; G01J 9/02
USPC ....................................................... 356/450
See application file for complete search history.

(56) References Cited

U.S. PATENT DOCUMENTS

| | | |
|---|---|---|
| 6,195,168 B1 | 2/2001 | De Lega et al. |
| 6,643,024 B2 | 11/2003 | Deck et al. |
| 6,804,011 B2 | 10/2004 | Kuechel |
| 10,890,428 B2 | 1/2021 | Deck |
| 10,962,348 B2 | 3/2021 | Deck |
| 2001/0017696 A1 | 8/2001 | Narita et al. |
| 2004/0141184 A1 | 7/2004 | Ueki |
| 2005/0157311 A1 | 7/2005 | Kuchel |
| 2007/0121115 A1 | 5/2007 | Hill |

(Continued)

OTHER PUBLICATIONS

Deck et al., "Dynamic illumination in Phase-shifting Interferometry", Proceedings of SPIE, vol. 12778, pp. 127780O-1-127780O-7 (Nov. 30, 2023).

(Continued)

*Primary Examiner* — Md M Rahman
(74) *Attorney, Agent, or Firm* — Fish & Richardson P.C.

(57) ABSTRACT

Disclosed is a method and corresponding apparatus for determining an absolute optical distance between two reflecting surfaces that make up an interferometric cavity, the method comprising: moving an illumination spot in a back focal plane of an interferometer along a trajectory that has a nonzero radial component relative to an optical axis to cause different radial positions for the illumination spot along the trajectory while synchronously acquiring images of interferograms of the interferometric cavity; and using one or more electronic processors to analyze the images to determine a functional dependence of an optical path difference (OPD) for the interferometric cavity versus radial position for the illumination spot and extract the absolute optical distance between the two reflecting surfaces based on the determined functional dependence.

42 Claims, 7 Drawing Sheets

(56)                References Cited

U.S. PATENT DOCUMENTS

| 2010/0128283 | A1* | 5/2010 | Liesener ............. | G01B 9/0209 |
| | | | | 359/370 |
| 2011/0216326 | A1 | 9/2011 | Sasaki et al. | |
| 2019/0346250 | A1 | 11/2019 | Weigmann et al. | |

OTHER PUBLICATIONS

Deck, "Fourier-transform phase shifting interferometry", *Applied Optics*, vol. 42, No. 13, pp. 2354-2365 (May 1, 2003).
Deck, "Model-based phase shifting interferometry", *Applied Optics*, vol. 53, No. 21, pp. 4628-4636 (Jul. 20, 2014).
Duan, et. al., "Synthetic spatial coherence function for optical tomography and profilometry: simultaneous realization of longitudinal coherence scan and phase shift" *Proceedings of SPIE*, Interferometry XI: Techniques and Analysis, vol. 4777, pp. 110-117 (2002).
Heil, et. al., "Interferometric spatial coherence tomography: focusing fringe contrast to planes of interest using a quasi-monochromatic structured light source" Applied Optics, vol. 51, No. 15, pp. 3059-3070 (May 20, 2012).
Mantravadi et al., "Newton, Fizeau, and Haidinger Interferometers,", *Optical Shop Testing*, edited by Daniel Malacara, pp. 1-45 (2007).
Schreiber et al., "Phase Shifting Interferometry", Optical Shop Testing, Third Edition, (John Wiley & Sons, Inc.) Edited by D. Malacara, pp. 547-666 (2007).
The International Search Report and Written Opinion of the International Searching Authority for International Application No. PCT/US2024/050209, dated Nov. 14, 2024.

\* cited by examiner

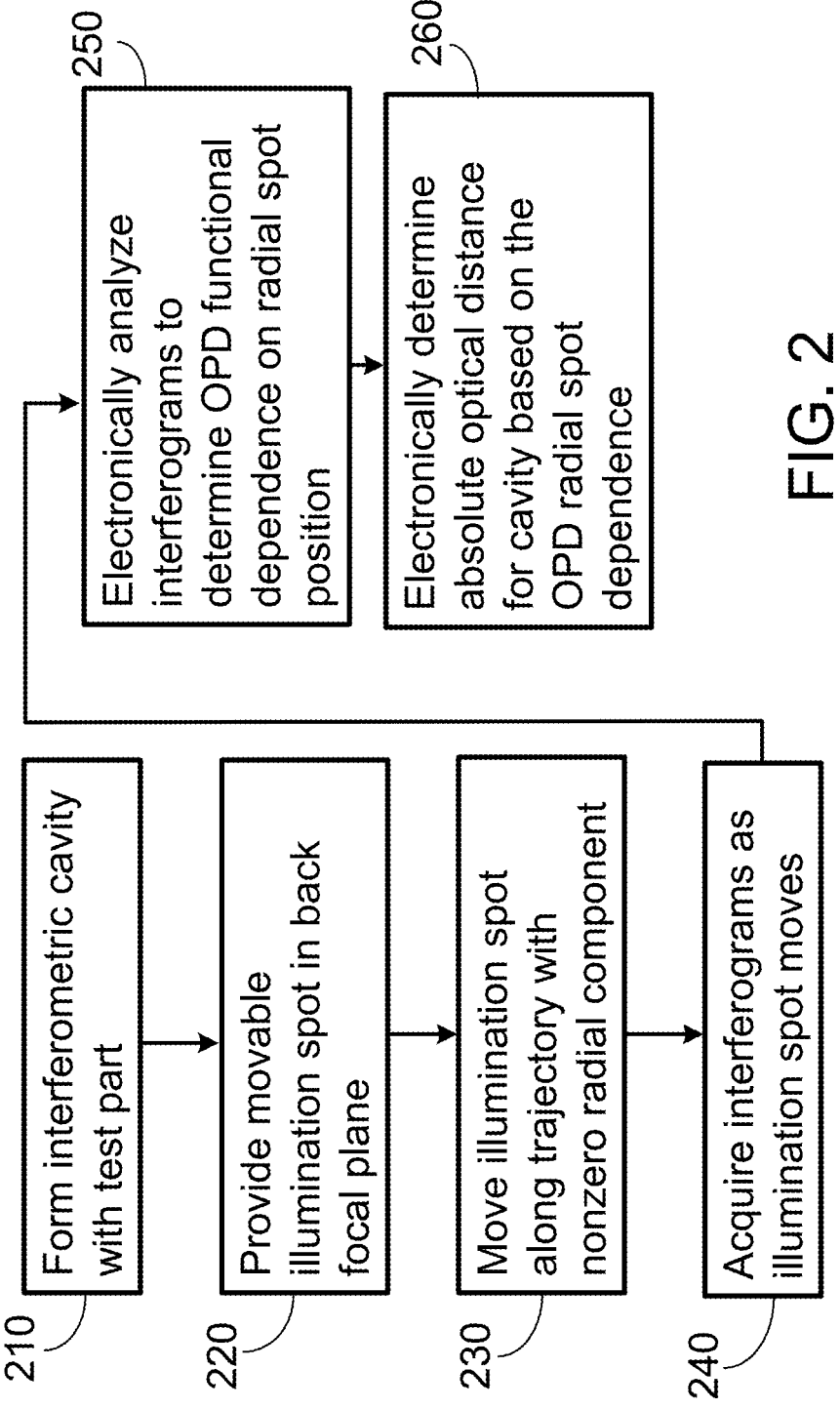

210 Form interferometric cavity with test part

220 Provide movable illumination spot in back focal plane

230 Move illumination spot along trajectory with nonzero radial component

240 Acquire interferograms as illumination spot moves

250 Electronically analyze interferograms to determine OPD functional dependence on radial spot position 260 Electronically determine absolute optical distance for cavity based on the OPD radial spot dependence

INTERFEROMETRIC METHOD FOR MEASURING OPTICAL DISTANCE

CROSS-REFERENCE TO RELATED APPLICATIONS

This application claims priority to provisional application No. 63/544,019 filed Oct. 13, 2023, the contents of which is incorporated herein in its entirety.

TECHNICAL FIELD

This disclosure relates to optical interferometry.

BACKGROUND

Laser interferometers are a widely used tool for high-precision measurements of engineered surfaces. Often incorporating phase-shifting interferometry (PSI) techniques, surface characteristics can be measured to fractions of a nanometer quickly and conveniently. The laser interferometer has a conveniently long temporal coherence, making it easy to observe high contrast interference even with large unequal optical paths between interfering surfaces. A Fizeau geometry is particularly popular for its ease of setup and common path architecture. Combined with a laser, a Fizeau is ideally suited for the long optical paths one often encounters when characterizing large or complex optical assemblies.

Surface profiling interferometers are imaging systems and so performance is optimized when the surface under test is in focus. U.S. Pat. No. 10,890,428 teaches a method and apparatus designed to measure the optical distance between two surfaces in an interferometer outfitted with a wavelength tunable laser. If one of those surfaces is the reference surface, then an autofocus method is also enabled if the reference surface position relative to the imaging system is known.

An additional feature enabled by a wavelength tunable laser is the ability to measure the absolute optical distance between interfering surfaces.

However, many interferometers use a fixed wavelength laser due to their simplicity and low cost. It would be useful to enable autofocus and the absolute optical distance capabilities without requiring a wavelength tunable laser.

SUMMARY

Disclosed herein is a method and apparatus that determines the absolute optical distance between two reflecting surfaces that make up an interferometric cavity. The apparatus includes an interferometer outfitted with a dynamic illumination system; means for moving the illumination spot in the back focal plane of the interferometer along a trajectory that has a nonzero radial component relative to the optical axis while synchronously acquiring cavity interferograms; means for analyzing the interferograms for the functional dependence of the optical path length difference ("OPD") versus spot radial position; and means for extracting the cavity absolute optical distance between the cavity surfaces from the measured functional dependence.

Embodiments may further include any of: wherein the spot trajectory is a linear trajectory; wherein the spot trajectory is a nonlinear trajectory; wherein the spot trajectory passes through the optical axis; wherein the spot trajectory is a smooth continuous motion with interferograms acquired continuously during the motion; wherein the spot trajectory is a series of stop-and-stare positions along the trajectory and PSI measurements are made during the stationary periods; and calculating the optical distance between the cavity bounding surfaces using a regression fit of the interferometric phase piston variation versus the spot radial position to the theoretical dependence with the optical distance a free parameter.

In general, in one aspect, disclosed is a system for determining an absolute optical distance between two reflecting surfaces that make up an interferometric cavity, wherein the system includes: a) an interferometer having an optical axis and configured to define the interferometric cavity with a test part; b) a dynamic illumination system configured for moving an illumination spot in a back focal plane of the interferometer along a trajectory that has a nonzero radial component relative to the optical axis to cause different radial positions for the illumination spot along the trajectory; c) a detector configured to acquire images of interferograms of the interferometric cavity as the dynamic illumination system moves an illumination spot in a back focal plane of the interferometer along the trajectory that has the nonzero radial component relative to the optical axis; and d) an electronic controller coupled to the dynamic illumination system and the detector and configured to analyze the interferograms to determine a functional dependence of an optical path length difference (OPD) for the interferometric cavity versus spot radial position and extract the absolute optical distance between the two reflecting surfaces from based on the functional dependence.

In general, in another aspect, disclosed is a method for determining an absolute optical distance between two reflecting surfaces that make up an interferometric cavity, the method including: a) moving an illumination spot in a back focal plane of an interferometer along a trajectory that has a nonzero radial component relative to an optical axis to cause different radial positions for the illumination spot along the trajectory while synchronously acquiring images of interferograms of the interferometric cavity; and b) using one or more electronic processors to analyze the images to determine a functional dependence of an optical path difference (OPD) for the interferometric cavity versus radial position for the illumination spot and extract the absolute optical distance between the two reflecting surfaces based on the determined functional dependence.

Embodiments of the system and method of these aspects may include any of the following features.

The test part can include the two reflecting surfaces that make up the interferometric cavity.

The interferometer can include a reference surface defining one of the two reflecting surfaces and wherein the test part defines the other of the two reflecting surfaces that make up the interferometric cavity. For example, the reference surface can be a surface of a reference flat, or the reference surface can be a surface of a transmission sphere. In certain embodiments, the interferometer includes a phase-shifter mechanically coupled to the reference surface.

The interferometer can include a collimation optics for directing light to the interferometric cavity, and wherein the collimation optics define the back focal plane of the interferometer. The interferometer can further include a beam splitter and imaging optics for imaging the interferograms of the interferometric cavity onto the detector.

The interferometer can be, for example, a Michelson interferometer, a Twyman-Green interferometer or a Fizeau interferometer.

The dynamic illumination system can include a source of system light (such as a laser) and a steering-mirror assembly to receive and reflect the system-light in at least two orthogonal directions. Furthermore, in certain embodiments, the electronic controller stores calibration information for mapping the angular orientation of the steering-mirror assembly to the location of the illumination spot in the source plane of the interferometer. For example, the electronic controller can include a memory for storing information defining a predetermined motion for the trajectory of the illumination spot provided by the dynamic illumination system. For example, the predetermined motion trajectory can include a linear trajectory that passes through the optical axis.

The system can further include a variable focus mechanism to focus the test surface onto the detector.

In certain embodiments, the electronic controller is configured to cause the detector to acquire the images of the interferograms continuously as the illumination spot moves in the back focal plane along a predefined trajectory.

In certain embodiments, the electronic controller is configured to cause the detector to acquire images of the interferograms for each of multiple phase shifts provided by a phase-shifter in the interferometer at each of multiple locations of the trajectory of the illumination spot in the back focal plane.

Each interferogram image can include spatially dependent intensity values that have a sinusoidal dependence on the optical path length difference (OPD) and wherein the optical path length dependence can be expressed by a sum of a spatially independent term that depends on the radial position of the illumination spot in the back focal plane and a spatially dependent offset term that does not depend on the radial position of the illumination spot in the back focal plane.

For example, in certain embodiments, the electronic controller is configured to extract the spatially dependent offset term based on phase-shifted interferograms produced by a phase shifter in the interferometer. In other embodiments, for example, the electronic controller is configured to extract an average optical path length difference (OPD) for each of different radial positions of the illumination spot by averaging over spatially dependent offset term that does not depend on the radial position of the illumination spot in the back focal plane. Furthermore, the electronic controller can be configured to extract the absolute optical distance between the two reflecting surfaces from a functional dependence of the average optical path length difference (OPD) on the different radial positions of the illumination spot.

Also, in certain embodiments, the electronic controller can be configured to extract the absolute optical distance between the two reflecting surfaces from a regression analysis on the interferogram images that accounts for the spatially independent term that depends on the radial position of the illumination spot in the back focal plane and the spatially dependent offset term that does not depend on the radial position of the illumination spot in the back focal plane.

In certain embodiments, the reflecting surfaces forming the interferometric cavity are substantially planar and wherein the spatially independent term can be expressed as $$OPD = 2G\left(1 - \frac{\alpha^2}{2}\right),$$

for $\alpha \ll 1$, where G is the absolute optical distance and $\alpha$ is the illumination angle of the interferometric cavity and is defined by the radial position of the illumination spot in the back focal plane of the interferometer.

In other certain embodiments, the interferometric cavity is a nominally spherical interferometric cavity formed with a transmission sphere reference surface having a focal length $f_{TS}$, and wherein the spatially independent term can be expressed as $$OPD = 2\left(\frac{f_{TS}G}{f_{TS} - G}\right)\left(1 - \frac{\alpha^2}{2}\right),$$

for $\alpha \ll 1$, where G is the paraxial absolute optical distance between the surfaces creating the interferometric cavity and $\alpha$ is the illumination angle in the interferometric cavity and is defined by the radial position of the illumination spot in the back focal plane of the interferometer.

As used herein, the term "cavity" represents two nominally confocal optical surfaces that are illuminated by the instrument. The two reflections interfere, and the interference is captured and analyzed by the instrument. Often one of the surfaces is a known reference surface.

Other embodiments are also within the scope of this disclosure.

DESCRIPTION OF DRAWINGS

FIG. 2 is a schematic flow chart for a method for measuring the optical distance G of an interferometric cavity.

Common references numerals in different figures refer to common features.

DETAILED DESCRIPTION

Disclosed herein is a method and apparatus for measuring the absolute optical distance between two surfaces that make up an interferometric cavity.

Figure 1:
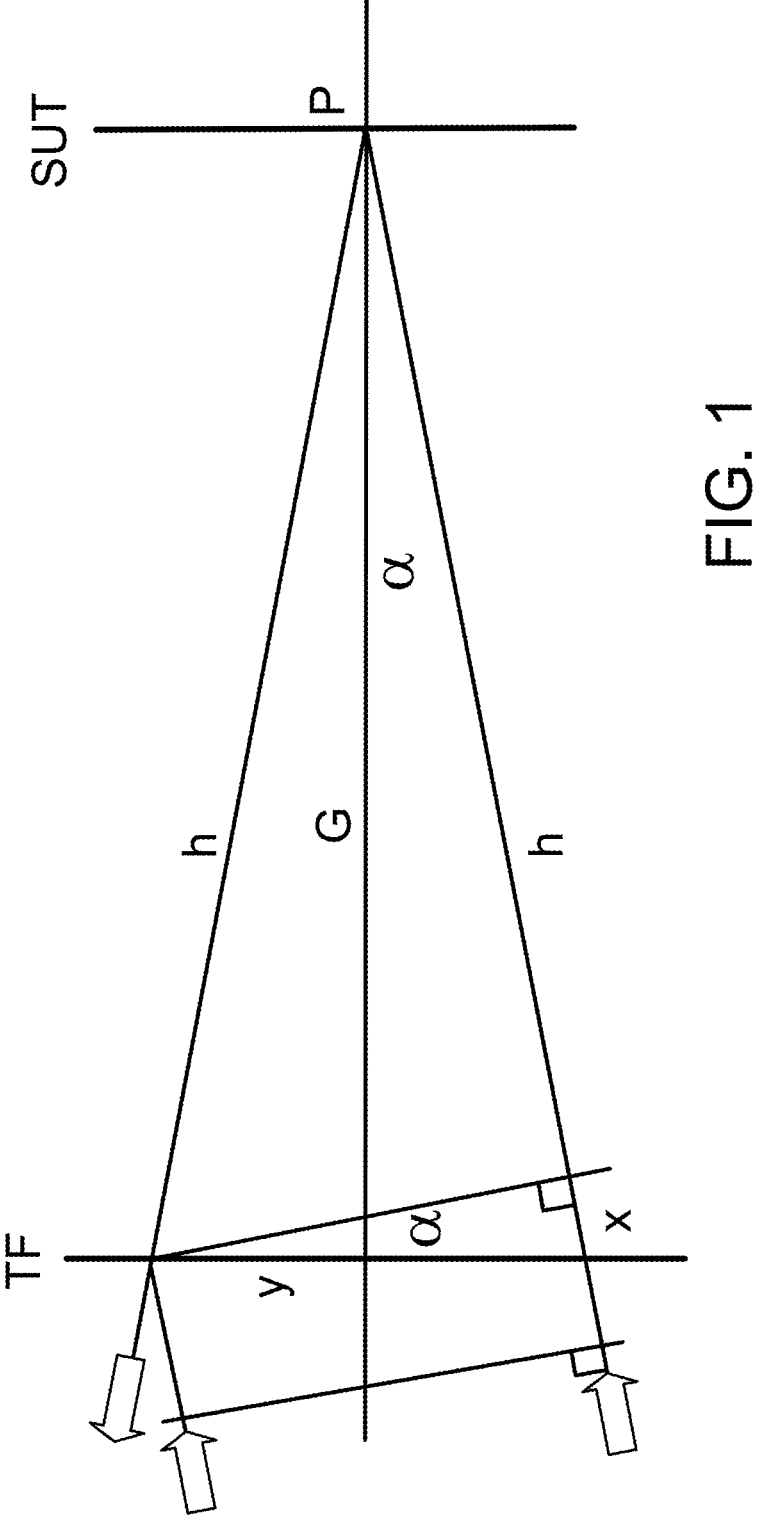
FIG. 1 is a schematic diagram of the geometry used to derive the dependence of the OPD to illumination angle $\alpha$.

The method involves an off-axis source point, which, following collimation, produces a tilted plane illumination wavefront and is directed to an interferometric cavity. The interference returning from a cavity illuminated by this wavefront experiences a phase shift that depends on the illumination tilt and the cavity length. The relationship can be derived with reference to FIG. 1 for a planar interferometric cavity, where G is the cavity length and $\alpha$ is the illumination angle relative to the optical axis, and where the cavity is defined with respect to a transmission flat reference surface ("TF") and a point P on a surface under test ("SUT"). Assuming point P is in focus, the interferometric total optical path difference OPD for the cavity is $$OPD = 2h - x = 2G\left(\frac{1}{\cos(\alpha)} - \tan(\alpha)\sin(\alpha)\right) = 2G\cos(\alpha) \quad (1)$$

$$= 2G\left(1 - \frac{\alpha^2}{2}\right) \text{ for } \alpha \ll 1$$

where $\sin \alpha = x/2y$ and $y = G \tan \alpha$. The illumination angle $\alpha$ is produced by moving the source point in the source plane to a radial position r away from the optical axis; i.e., $\alpha = r/F_C$ where $F_C$ is the collimator focal length. Recasting Eq. (1) into interference phase $\phi$ as a function of the radial component of the spot r we get;

$$\phi = 2 \text{ kG}\left(1 - \frac{r^2}{2F_c^2}\right), \quad (2)$$

where $k = 2\pi/\lambda$, and $\lambda$ is the light wavelength.

So aside from a constant offset term, $\phi$ is quadratic in $\alpha$. Using standard interferometric unwrapping techniques, the unwrapped phase $\Phi$ can be extracting from a PSI (or interferometric) measurement of $\phi$, and then a fit of $\Phi$ vs $\alpha$ to a quadratic form can be used to determine G via $$G = \frac{Q\lambda}{2\pi}, \quad (3)$$

where Q it the best fit quadratic coefficient.

Thus, by measuring the quadratic component of the phase piston as a function of $\alpha$, the value of G can be extracted. As explained further below, this quadratic component can be measured using a variety of interferometric systems and for a variety of test parts.

In general, the steps of the method are set forth in the flow chart of FIG. 2. In step 210, a test part is introduced into an interferometer to define interferometric cavity with the test part along an optical axis. For example, the interferometric cavity is formed by a reflective surface of the test part and the partially reflective surface in the interferometer. In step 220, a dynamic illumination source for the interferometer provides a movable illumination spot in a back focal plane of the interferometer. In step 230, the source moves the illumination spot along a trajectory that has a nonzero radial component relative to the optical axis to cause different radial positions for the illumination spot along the trajectory. In step 240, a detector acquires images of interferograms of the interferometric cavity as the dynamic illumination source moves the illumination spot in a back focal plane of the interferometer along the trajectory that has the nonzero radial component relative to the optical axis. In step 250, an electronic analysis of the interferograms is used to determine a functional dependence of an optical path length difference (OPD) for the interferometric cavity versus spot radial position. In step, 260, the electronic analysis extracts the absolute optical distance between the two reflecting surfaces defining the interferometric cavity based on the functional dependence, as demonstrated above in Equations 1-3 (as further modified as explained below, for the case of a nominally spherical interferometric cavity).

Because most interferometers image a test surface, the absolute distance G between the reference and test surfaces is an important parameter. For example, knowledge of this absolute distance G allows the interferometer to precisely focus on the test surface and maximize the measurement fidelity.

In certain embodiments, a starting surface phase map is initially determined using an interferometer (e.g., a shuttered PSI acquisition) with the source spot set to an on-axis position and analyzed to obtain a phase map using any of standard interferometry techniques known in the art. Thereafter, further measurements are made by sweeping the source spot through a linear trajectory that intersects the optical axis while simultaneously acquiring shuttered camera frames at known points in the trajectory. The shutter is kept short enough to eliminate contrast loss from by integrating phase variations produced by environmental vibrations or the motion trajectory. The piston shift is then calculated for each of the frames in the trajectory with the starting phase map. The unwrapped phase piston variation vs corresponding illumination angle $\alpha$ is compared to Eq (1) to determine G. Once G is determined, the focus plane can be adjusted to the position of the SUT if the focus position of the TF is known from a previous calibration. For example, for a flat cavity, focusing at a plane G away from the TF is best.

So knowing the following:
F=a vector of (unwrapped) phase pistons
r=a vector of spot radii (relative to the optical axis) for each point in the trajectory (in mm)
$\lambda$=mean wavelength (in mm)
k=wavenumber=$2*pi/\lambda$
$F_{col}$=collimator focal length (in mm)
Then:
$\alpha$=cavity illumination angle=$r/F_{col}$
Q=the quadratic coefficient from a $2^{nd}$ order polynomial fit of the piston variation of $\Phi$ vs $\alpha$
G=Q/k=the cavity gap in mm.

Figure 3:
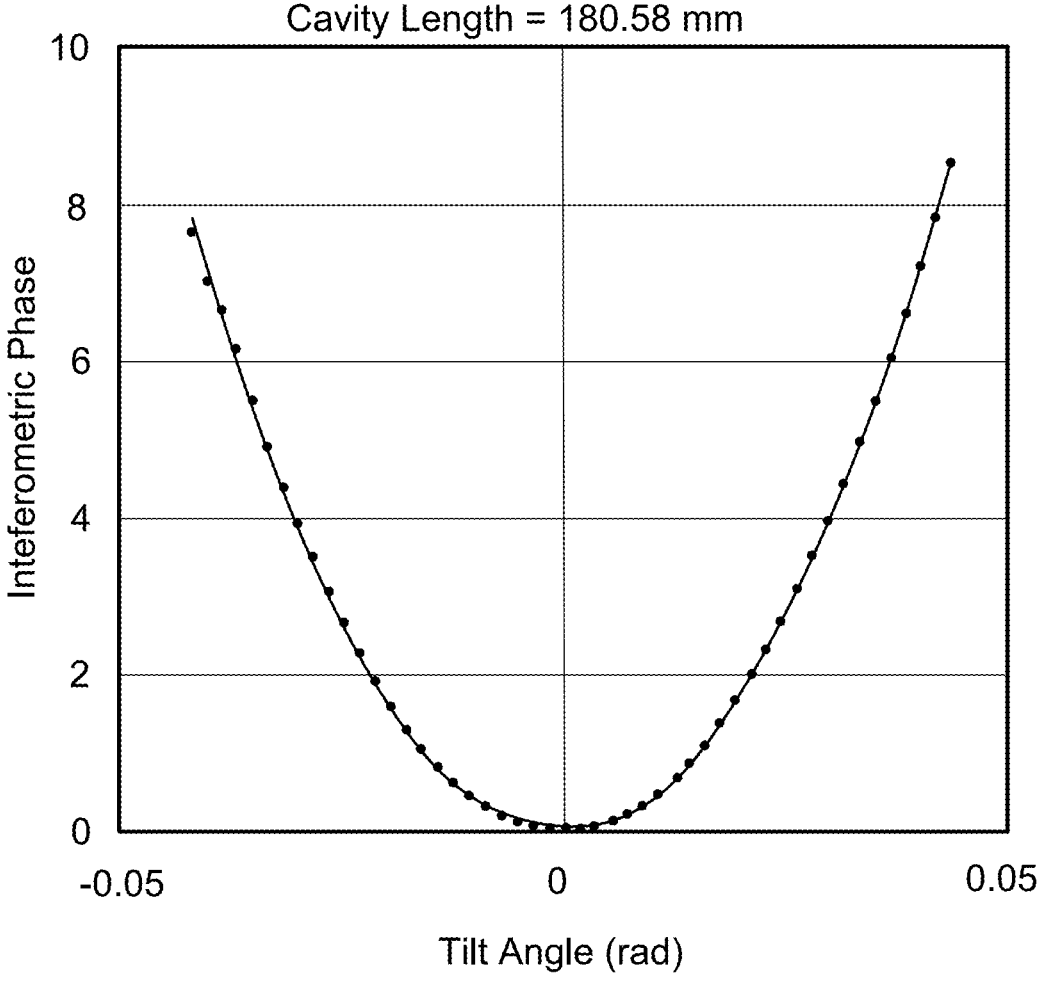
FIG. 3 is a graph of data from an actual breadboard measurement of a 180 mm cavity implementing the method of FIG. 2.

An actual example of the method is illustrated in FIG. 3, wherein the interferometric phase piston variation for a 180 mm plano cavity is observed at a number of spot positions producing the wavefront tilts in object space shown on the X-axis. The phase pistons were obtained from a PSI measurement at each point. The best fit quadratic coefficient Q was extracted from these data and G was then obtained using Eq. (1-3). The result indicated a cavity length of 180.58 mm, well within the uncertainty of the actual gap.

Figure 4:
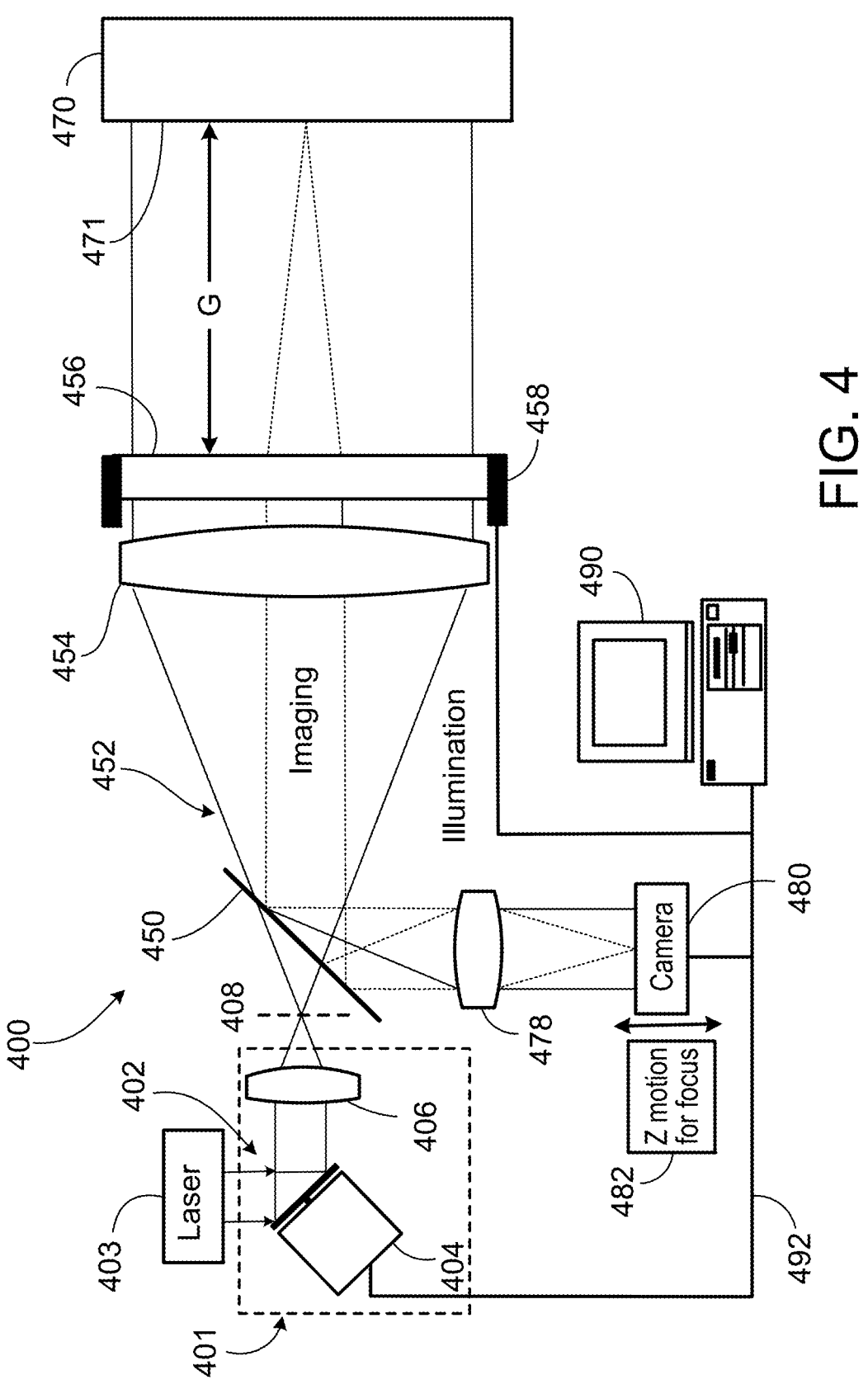
FIG. 4 is an embodiment of the interferometric system to measure the absolute optical cavity length of a flat interferometric cavity.

An interferometric system for implementing the measurement method is shown in FIG. 4. Specifically, the interferometric system 400 includes a dynamic illuminator 401, which receives a source beam 402 from a laser light source 403 and includes a two-dimensional steering mirror 404 configured to adjustably redirect the source beam in two orthogonal directions and a telecentric lens 406 to focus the redirected source beam onto a source plane 408. The interferometer includes a beam splitter 450 for passing the source light 452 toward the sample 470, which in this embodiment defines a nominally flat reflective test surface 471 (so in this embodiment, the SUT is surface 471), and reflecting light being imaged from the sample 470 toward a camera 480. The interferometer also includes a collimator lens 454 for collimating the source light and reference flat 456, which partially reflects the source light to form a reference wavefront and partially transmits the source light to the sample 470, which reflects it to form a test wavefront. The reference and test wavefronts combine to form an interferogram that is imaged by imaging optic 478 onto camera 480. A translatable stage 482 supports the camera 480 so that the test surface can be properly focused onto the camera. A phase shifter 458 (e.g., a mechanical transducer) is coupled to the reference flat 456 to implement phase-shifting interferometry techniques that are well-known in the art. The cavity length G is defined by the optical distance between the reference flat 456 and the sample 470. An electronic control system 490 is electronically coupled to the phase shifter and the detector for analyzing the interferograms. Moreover, the control system 490 provides control signals 492 to drive transducers in the beam steering mirror for the controlling the orientation of the beam steering mirror 404. Furthermore, the dynamic illuminator 401 may further include feedback techniques for monitoring the orientation of the beam steering mirror and implementing feedback to fine-tune any dynamic illumination, which is also controlled by control system 490. For example, the system can include any of the feedback embodiments disclosed in commonly owned patent application entitled "DYNAMIC INTERFEROMETER ILLUMINATOR" by Leslie L. Deck and James A. Soobitsky filed Aug. 30, 2024, the contents of which are incorporated herein by reference. During operation the control system 490 can drive the transducers in the beam steering mirror 404 to cause the illumination beam spot in source plane 408 to move along a predetermined trajectory to provide different radial positions for the illumination spot and implement the method of FIG. 2 to determine the absolute cavity length G. Feedback control signals back to control system 490 as in any of the embodiments shown in the commonly owned application "DYNAMIC INTERFEROMETER ILLUMINATOR" cited above, can ensure that the desired trajectory is stable. Also, the electronic control system 490 can include a memory (not shown) for storing information defining a predetermined motion for the trajectory of the illumination spot provided by the dynamic illumination system. Furthermore, electronic controller can store calibration information for mapping the angular orientation of the steering-mirror assembly to the location of the illumination spot in the source plane of the interferometer.

Figure 5:
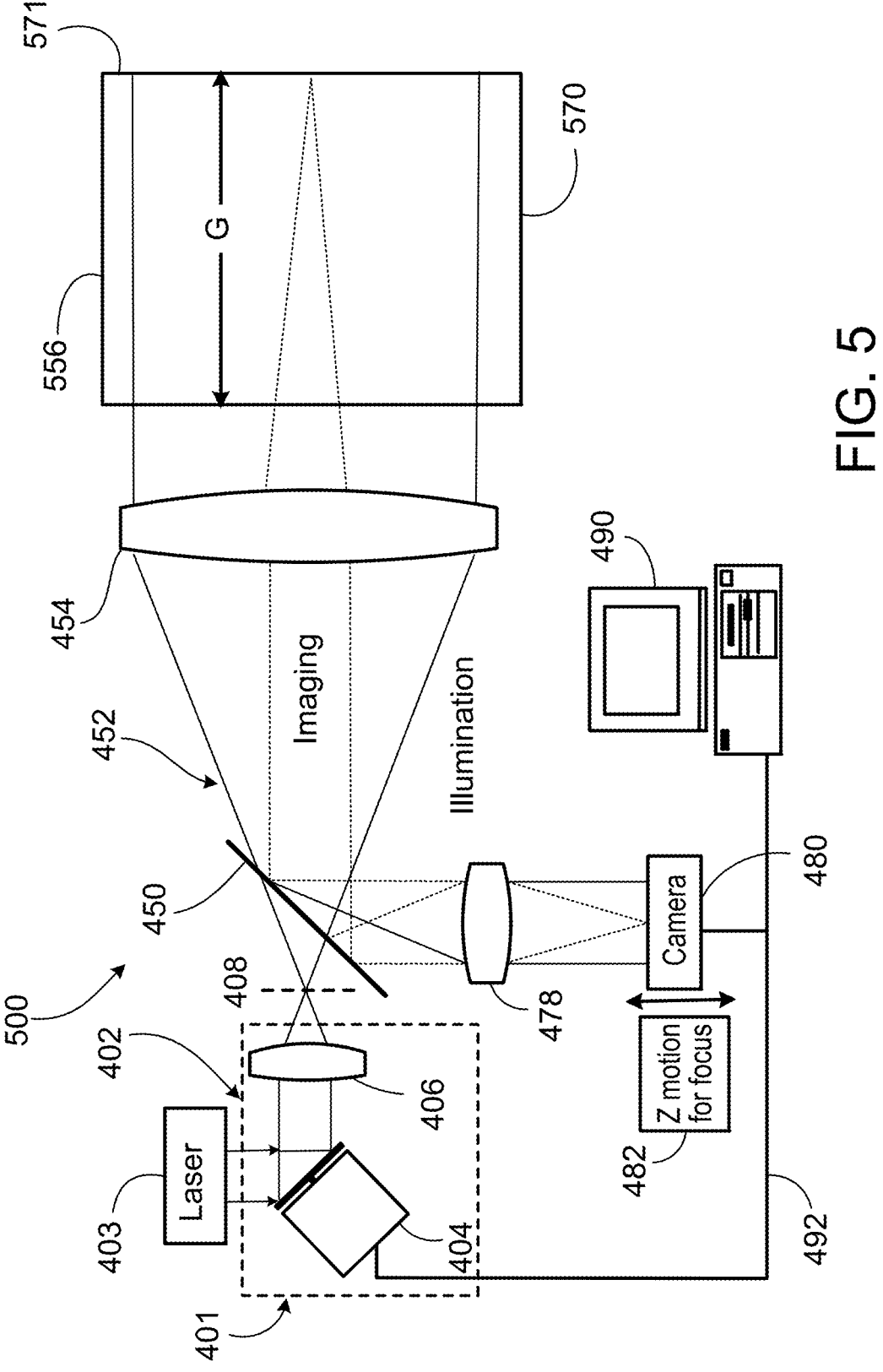
FIG. 5 is an embodiment of the interferometric system to measure the absolute optical cavity length of an interferometric cavity formed by a parallel plate.

The apparatus and method may also be implemented with different test samples and/or interferometers. For example, in the embodiment of the interferometry system 500 of FIG. 5, the interferometric cavity is formed by the front and back surfaces 556 and 571, respectively, of a partially transparent parallel plate 570. Otherwise, the system of FIG. 5 is substantially the same as that of FIG. 4. The system can be used to measure the variation of the piston component of the interferometric phase to allows one to solve for absolute optical cavity length G of the parallel plate, using the method of FIG. 2. Moreover, the physical thickness of the parallel plate can be extracted from the absolute optical cavity length G by dividing it by the bulk refractive index for plate, assuming it is known. Note that here, since the cavity is solid, mechanical PSI cannot be applied. Instead, both the cavity mean gap G and the spatial variation of the optical thickness are solved simultaneously, from interferograms acquired at different spot radial positions. This is possible because each interferogram provides multiple image points, thereby providing redundant information across the different spot radial positions.

For example, for each interferogram, the detector provides an image defined by spatially dependent intensity values that have a sinusoidal dependence on the optical path length difference (OPD) and wherein the optical path length dependence can be expressed by a sum of a spatially independent term that depends on the radial position of the illumination spot in the back focal plane and a spatially dependent offset term that does not depend on the radial position of the illumination spot in the back focal plane. For example, for a flat SUT, the spatially independent term can be expressed as $$OPD = 2G\left(1 - \frac{\alpha^2}{2}\right),$$

for $\alpha \ll 1$, where G is the absolute optical distance and $\alpha$ is the illumination angle of the interferometric cavity and is defined by the radial position of the illumination spot in the back focal plane of the interferometer.

During operation, in certain embodiments, the electronic controller is configured to extract the spatially dependent offset term based on phase-shifted interferograms produced by a phase shifter in the interferometer. Moreover, in certain embodiments, the electronic controller is configured to extract an average optical path length difference (OPD) for each of different radial positions of the illumination spot by averaging over spatially dependent offset term that does not depend on the radial position of the illumination spot in the back focal plane. Then, the electronic controller is configured to extract the absolute optical distance between the two reflecting surfaces from a functional dependence of the average optical path length difference (OPD) on the different radial positions of the illumination spot.

In yet further embodiments, the electronic controller can be configured to extract the absolute optical distance between the two reflecting surfaces from a regression analysis on the interferogram images that accounts for the spatially independent term that depends on the radial position of the illumination spot in the back focal plane and the spatially dependent offset term that does not depend on the radial position of the illumination spot in the back focal plane.

Figure 6:
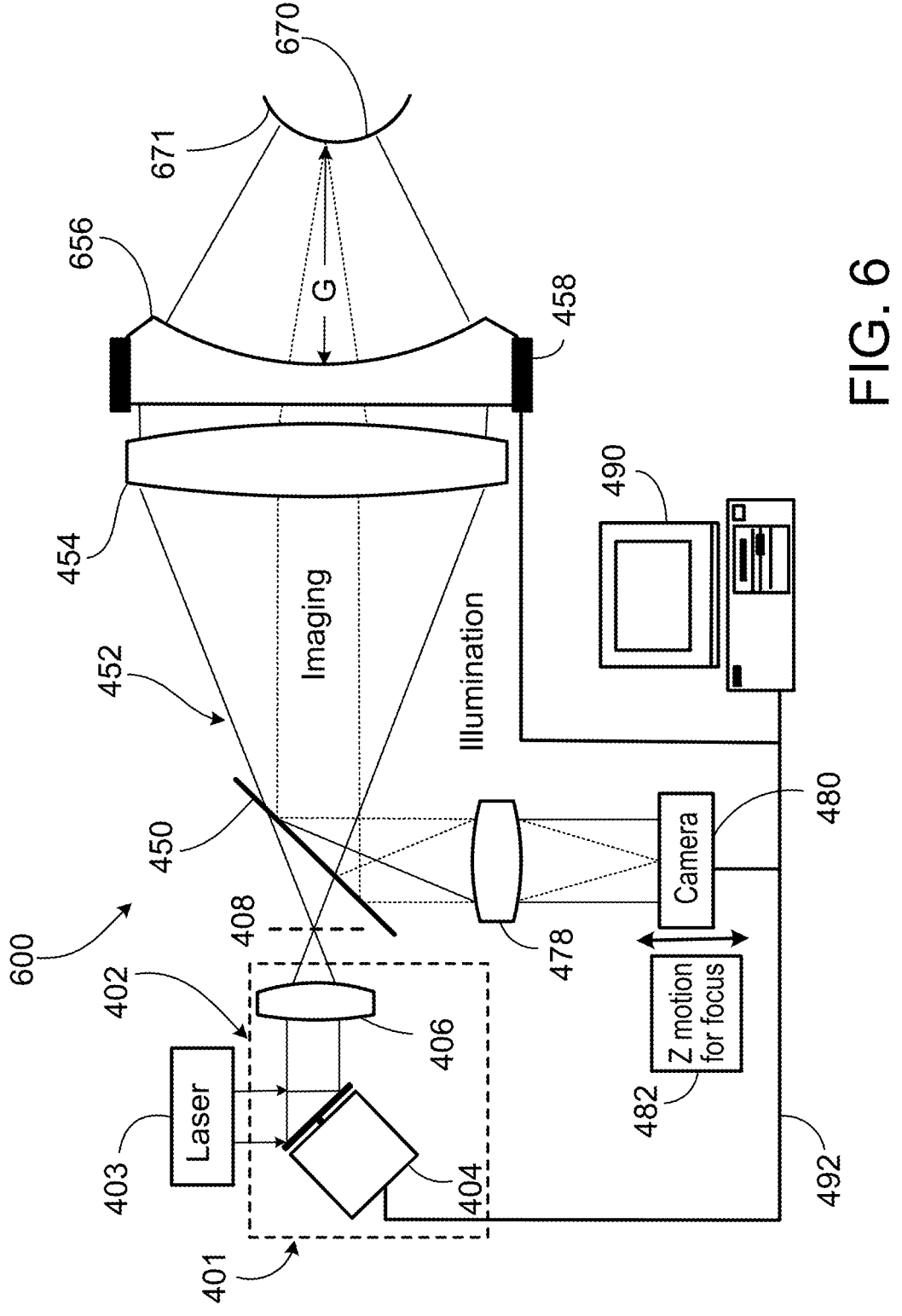
FIG. 6 is an embodiment of the interferometric system to measure the absolute optical cavity length of a spherical interferometric cavity.

In yet another example, the embodiment of FIG. 6 illustrates an interferometry system for measuring the absolute optical gap G in a spherical cavity with a test object 670 having a spherical reflective surface 671 to define the test surface. The interferometry system 600 of FIG. 6 is similar to that of FIG. 4, except that the reference flat 456 is replaced with a spherical reference optic 656 called a transmission sphere (TS) with focal length $f_{TS}$, the last surface of which defines the reference surface. As indicated in FIG. 6, the interferometric cavity formed by spherical SUT 671 and TS 656 is set to nominally satisfy the confocal condition. Specifically, for a convex test surface as in FIG. 6, SUT 671 is nominally positioned at a distance $G=(f_{TS}-R)$ from TS 656, whereas for a concave test surface, the test surface is nominally positioned at a distance $G=(f_{TS}+R)$, where R is the absolute value of the nominal radius of curvature for the test surface.

Furthermore, in a spherical geometry like that of FIG. 6, the longitudinal magnification depends on where the SUT is relative to the TS, and as a consequence, the quadratic dependence of the OPD on the radial position of the illumination spot in the back focal plane of the interferometer differs from that shown in Equations 1-3. One can determine this relationship by converting the spherical cavity to an optically equivalent plane geometry, as in FIG. 1. A straightforward paraxial image analysis then shows that the measured gap $G_m$ for the resulting optically equivalent plane geometry is given by $$G_m = \frac{f_{TS} G}{f_{TS} - G} \qquad (4)$$

with G the absolute optical distance between the TS reference and the test surface in the real object space. Notably, in the limit of a vary large focal length for TS, i.e., $f_{TS} \gg 1$, the result approaches that for a planar cavity, with $G_m \sim G$. Accordingly, Equations 1-3 can be generalized to account for both planar and spherical cavities, by substituting G in Equations 1-3 with $G_m$ as defined in Equation 4.

Also, to acquire interferograms in-focus, the z-position of the detector is adjusted to focus at a position $G_m$ past the TS reference surface, instead of the actual position of the SUT at the position G past the TS reference surface.

One application for the measurement of absolute optical gaps in the spherical cavity in FIG. 6 is to apply the methods of commonly owned U.S. Pat. No. 10,890,428, the contents of which are incorporated herein by reference.

Figure 7A:
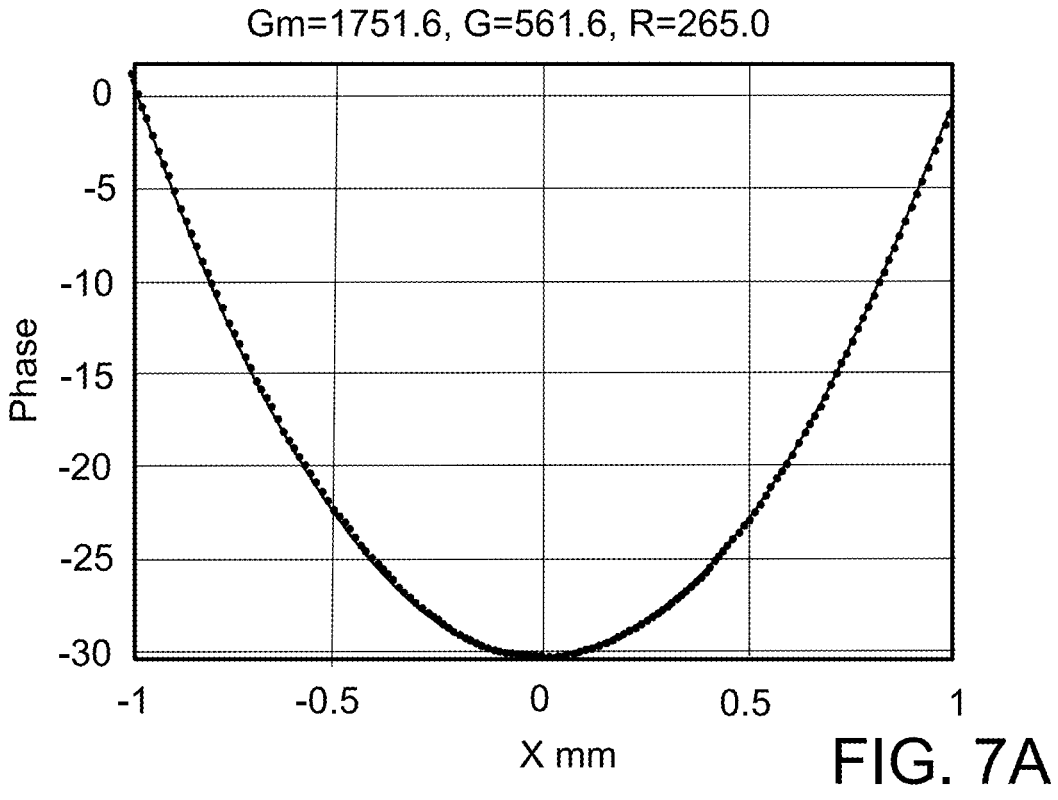
FIGS. 7a and 7b are graphs of data from an actual breadboard measurement of spherical cavities for a convex surface under test (FIG. 7a) and a concave surface under test (FIG. 7b) implementing the method of FIG. 2.
Figure 7B:
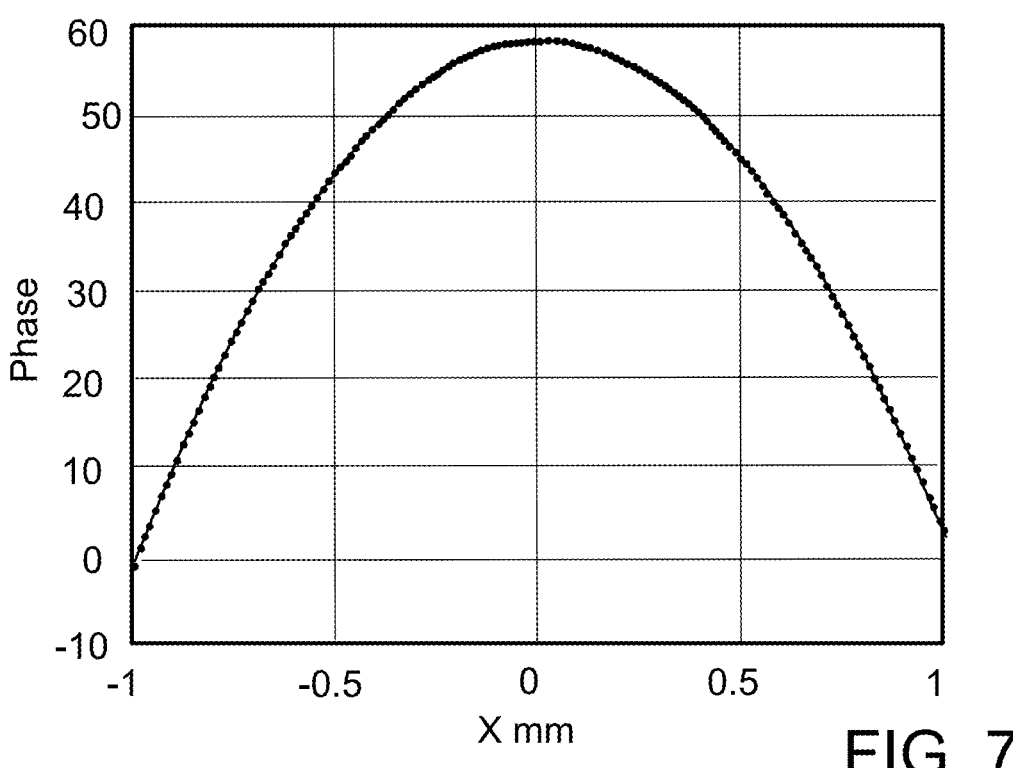

FIGS. 7a and 7b show actual measurements of the measured interferometric phase versus the radial position of the source point in the back focal plane for a spherical interferometric cavity for the case of a convex SUT (FIG. 7a) and a concave SUT (FIG. 7b), respectively. The measurements are for an F/5.4 TS (826.5 mm focal length) and a 265 mm radius convex surface (FIG. 7a) and a 290 mm radius concave surface (FIG. 7b).

The measurements show the expected quadratic dependence, with apparent optical distances $G_m$ of 1751.6 mm or −3162.9 mm for the convex and concave SUTs, respectively, as extracted from the modified Equation 3, where G in Equation 3 is substituted with $G_m$ as defined in Equation 4. Notably, $G_m$ for concave surface is negative, which is to be expected, based on Equation 4. Applying Equation 4 yields actual optical distance G of 581.6 mm and 1118.9 mm for the mm for the convex and concave SUTs, respectively.

Digital Implementations

The features of the electronic control system can be implemented, at least in part, in digital electronic circuitry, or in computer hardware, firmware, or in combinations of these. For example, at least some of the features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor, such as multiple processors, coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; solid-state disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The features can be implemented in a single process or distributed among multiple processors at one or many locations. For example, the features can employ cloud technology for data transfer, storage, and/or analysis.

Other embodiments are within the scope of the claims.

What is claimed is:

1. A system for determining an absolute optical distance between two reflecting surfaces that make up an interferometric cavity, wherein the system comprises:

(a) an interferometer having an optical axis and configured to define the interferometric cavity with a test part;

(b) a dynamic illumination system configured for moving an illumination spot in a back focal plane of the interferometer along a trajectory that has a nonzero radial component relative to the optical axis to cause different radial positions for the illumination spot along the trajectory;

(c) a detector configured to acquire images of interferograms of the interferometric cavity as the dynamic illumination system moves an illumination spot in a back focal plane of the interferometer along the trajectory that has the nonzero radial component relative to the optical axis; and (d) an electronic controller coupled to the dynamic illumination system and the detector and configured to analyze the interferograms to determine a functional dependence of an optical path length difference (OPD) for the interferometric cavity versus spot radial position and extract the absolute optical distance between the two reflecting surfaces from based on the functional dependence.

2. The system of claim 1, wherein the test part comprises the two reflecting surfaces that make up the interferometric cavity.

3. The system of claim 1, wherein the interferometer comprises a reference surface defining one of the two reflecting surfaces and wherein the test part defines the other of the two reflecting surfaces that make up the interferometric cavity.

4. The system of claim 3, wherein the reference surface is a surface of a reference flat.

5. The system of claim 3, wherein the reference surface is a surface of a transmission sphere.

6. The system of claim 3, wherein the interferometer comprises a phase-shifter mechanically coupled to the reference surface.

7. The system of claim 1, wherein the interferometer comprises a collimation optics for directing light to the interferometric cavity, and wherein the collimation optics define the back focal plane of the interferometer.

8. The system of claim 7, wherein the interferometer further comprises a beam splitter and imaging optics for imaging the interferograms of the interferometric cavity onto the detector.

9. The system of claim 1, wherein the interferometer is a Michelson interferometer, a Twyman-Green interferometer or a Fizeau interferometer.

10. The system of claim 1, wherein the dynamic illumination system comprises a source of system light and a steering-mirror assembly to receive and reflect the system-light in at least two orthogonal directions.

11. The system of claim 10, wherein the electronic controller stores calibration information for mapping the angular orientation of the steering-mirror assembly to the location of the illumination spot in the source plane of the interferometer.

12. The system of claim 10, wherein the electronic controller comprises a memory for storing information defining a predetermined motion for the trajectory of the illumination spot provided by the dynamic illumination system.

13. The system of claim 12, wherein the predetermined motion trajectory comprises a linear trajectory that passes through the optical axis.

14. The system of claim 10, wherein the source of system light comprises a laser.

15. The system of claim 1, further comprising a variable focus mechanism to focus the test surface onto the detector.

16. The system of claim 1, wherein the electronic controller is configured to cause the detector to acquire the images of the interferograms continuously as the illumination spot moves in the back focal plane along a predefined trajectory.

17. The system of claim 1, wherein the electronic controller is configured to cause the detector to acquire images of the interferograms for each of multiple phase shifts provided by a phase-shifter in the interferometer at each of multiple locations of the trajectory of the illumination spot in the back focal plane.

18. The system of claim 1 wherein each interferogram image comprises spatially dependent intensity values that have a sinusoidal dependence on the optical path length difference (OPD) and wherein the optical path length dependence can be expressed by a sum of a spatially independent term that depends on the radial position of the illumination spot in the back focal plane and a spatially dependent offset term that does not depend on the radial position of the illumination spot in the back focal plane.

19. The system of claim 18, wherein the electronic controller is configured to extract the spatially dependent offset term based on phase-shifted interferograms produced by a phase shifter in the interferometer.

20. The system of claim 18, wherein the electronic controller is configured to extract an average optical path length difference (OPD) for each of different radial positions of the illumination spot by averaging over spatially dependent offset term that does not depend on the radial position of the illumination spot in the back focal plane.

21. The system of claim 20, wherein the electronic controller is configured to extract the absolute optical distance between the two reflecting surfaces from a functional dependence of the average optical path length difference (OPD) on the different radial positions of the illumination spot.

22. The system of claim 18, wherein the electronic controller is configured to extract the absolute optical distance between the two reflecting surfaces from a regression analysis on the interferogram images that accounts for the spatially independent term that depends on the radial position of the illumination spot in the back focal plane and the spatially dependent offset term that does not depend on the radial position of the illumination spot in the back focal plane.

23. The system of claim 18, wherein the reflecting surfaces forming the interferometric cavity are substantially planar and wherein the spatially independent term can be expressed as $$OPD = 2G\left(1 - \frac{\alpha^2}{2}\right),$$

for $\alpha \ll 1$, where G is the absolute optical distance and $\alpha$ is the illumination angle of the interferometric cavity and is defined by the radial position of the illumination spot in the back focal plane of the interferometer.

24. The system of claim 18, wherein the interferometric cavity is a nominally spherical interferometric cavity formed with a transmission sphere reference surface having a focal length $f_{TS}$, and wherein the spatially independent term can be expressed as $$OPD = 2\left(\frac{f_{TS}G}{f_{TS} - G}\right)\left(1 - \frac{\alpha^2}{2}\right),$$

for $\alpha \ll 1$, where G is the paraxial absolute optical distance between the surfaces creating the interferometric cavity and $\alpha$ is the illumination angle in the interferometric cavity and is defined by the radial position of the illumination spot in the back focal plane of the interferometer.

25. A method for determining an absolute optical distance between two reflecting surfaces that make up an interferometric cavity, the method comprising:

(a) moving an illumination spot in a back focal plane of an interferometer along a trajectory that has a nonzero radial component relative to an optical axis to cause different radial positions for the illumination spot along the trajectory while synchronously acquiring images of interferograms of the interferometric cavity; and (b) using one or more electronic processors to analyze the images to determine a functional dependence of an optical path difference (OPD) for the interferometric cavity versus radial position for the illumination spot and extract the absolute optical distance between the two reflecting surfaces based on the determined functional dependence.

26. The method of claim 25, wherein the two reflecting surfaces are formed by a test part illuminated by the interferometer.

27. The method of claim 25, wherein the interferometer comprises a reference surface defining one of the two reflecting surfaces and wherein a test part defines the other of the two reflecting surfaces.

28. The method of claim 27, wherein the reference surface is a surface of a reference flat.

29. The method of claim 27, wherein the reference surface is a surface of a transmission sphere.

30. The method of claim 27, wherein the interferometer includes a phase-shifter mechanically coupled to the reference surface.

31. The method of claim 25, wherein the interferometer comprises a collimation optics for directing light to the interferometric cavity, and wherein the collimation optics define the back focal plane of the interferometer.

32. The method of claim 25, wherein a dynamic illumination system comprising a source of system light and a steering-mirror assembly to receive and reflect the system-light in at least two orthogonal directions is used to move the illumination sport in the back focal plane.

33. The method of claim 25, wherein the trajectory of the illumination spot comprises a linear trajectory passing through the optical axis.

34. The method of claim 25, wherein the images of the interferograms are acquired continuously as the illumination spots moves in the back focal plane.

35. The method of claim 34, wherein the images of the interferograms are acquired for each of multiple phase shifts provided by a phase-shifter in the interferometer at each of multiple locations of the trajectory of the illumination spot in the back focal plane.

36. The method of claim 25, wherein each interferogram image comprises spatially dependent intensity values that have a sinusoidal dependence on the optical path length difference (OPD) and wherein the optical path length dependence can be expressed by a sum of a spatially independent term that depends on the radial position of the illumination spot in the back focal plane and a spatially dependent offset term that does not depend on the radial position of the illumination spot in the back focal plane.

37. The method of claim 36, wherein the analysis of the images comprises extracting the spatially dependent offset term base on phase-shifted interferograms produced by a phase shifter in the interferometer.

38. The method of claim 36, wherein the analysis of the images comprises extracting an average optical path length difference (OPD) for each of different radial positions of the illumination spot by averaging over spatially dependent offset term that does not depend on the radial position of the illumination spot in the back focal plane.

39. The method of claim 38, wherein the analysis of the images further comprises extracting the absolute optical distance between the two reflecting surfaces from a functional dependence of the average optical path length difference (OPD) on the different radial positions of the illumination spot.

40. The method of claim 36, wherein the analysis of the images comprises extracting the absolute optical distance between the two reflecting surfaces from a regression analysis on the interferogram images that accounts for the spatially independent term that depends on the radial position of the illumination spot in the back focal plane and the spatially dependent offset term that does not depend on the radial position of the illumination spot in the back focal plane.

41. The method of claim 36, wherein the reflecting surfaces forming the interferometric cavity are substantially planar and wherein the spatially independent term can be expressed as $$OPD = 2G\left(1 - \frac{\alpha^2}{2}\right),$$

for $\alpha \ll 1$, where G is the absolute optical distance and $\alpha$ is the illumination angle of the interferometric cavity and is defined by the radial position of the illumination spot in the back focal plane of the interferometer.

42. The method of claim 36, wherein the interferometric cavity is a nominally spherical interferometric cavity formed with a transmission sphere reference surface having a focal length $f_{TS}$, and wherein the spatially independent term can be expressed as $$OPD = 2\left(\frac{f_{TS}G}{f_{TS} - G}\right)\left(1 - \frac{\alpha^2}{2}\right),$$

for $\alpha \ll 1$, where G is the paraxial absolute optical distance between the surfaces creating the interferometric cavity and $\alpha$ is the illumination angle in the interferometric cavity and is defined by the radial position of the illumination spot in the back focal plane of the interferometer.

* * * * *